No. 769,776. PATENTED SEPT. 13, 1904.
J. A. STEINHEIMER & G. W. MILLER.
LEVER HOOF TRIMMER.
APPLICATION FILED FEB. 2, 1904.
NO MODEL.
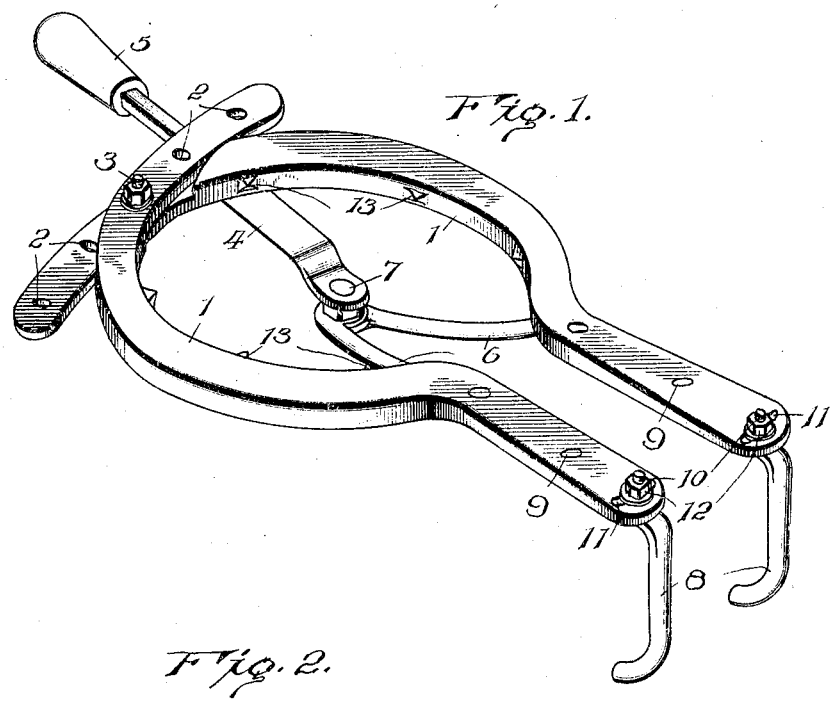
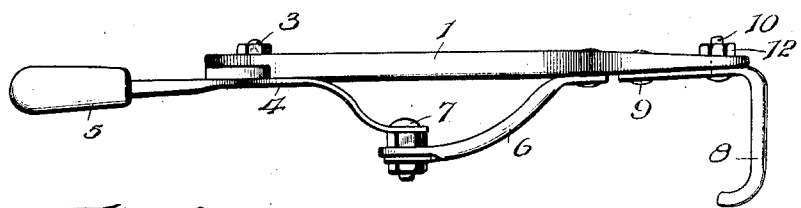
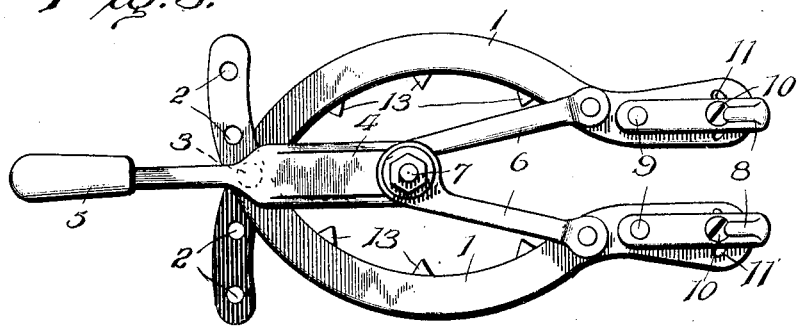
Inventors
J. A. Steinheimer,
G. W. Miller
Witnesses No. 769,776.  
Patented September 13, 1904.

UNITED STATES PATENT OFFICE.

JAMES A. STEINHEIMER AND GEORGE WASHINGTON MILLER, OF LOWRY CITY, MISSOURI.

LEVER HOOF-TRIMMER.

SPECIFICATION forming part of Letters Patent No. 769,776, dated September 13, 1904.

Application filed February 2, 1904. Serial No. 191,723. (No model.)

*To all whom it may concern:*

Be it known that we, JAMES A. STEINHEIMER and GEORGE WASHINGTON MILLER, citizens of the United States, residing at Lowry City, in the county of St. Clair and State of Missouri, have invented certain new and useful Improvements in Lever Hoof-Trimmers, of which the following is a specification.

This invention relates to improvements in devices for trimming hoofs, and aims to provide an implement of this class which will afford a substitute for the commonly-used trimming-knife employed to pare the hoof preparatory to securing the shoe thereon.

Our invention comprises a special form of clamping means which carries a trimming-knife applied thereto and secured in working position in such a manner as to facilitate the cutting or paring operation to a maximum degree.

For a full description of the invention and the merits thereof and also to acquire a knowledge of the details of construction of the means for effecting the result, reference is to be had to the following description and accompanying drawings.

While the essential and characteristic features of the invention are susceptible of modification, still the preferred embodiment of the invention is illustrated in the accompanying drawings, in which—

Figure 1 is a perspective view of the invention. Fig. 2 is a side elevation of the device constructed in accordance with my invention. Fig. 3 is a plan view showing more clearly the relative arrangement of parts.

Corresponding and like parts are referred to in the following description and indicated in all the views of the drawings by the same reference characters.

Referring to the drawings, the device consists of clamp members 1 of like form, said members having the body portions thereof curved so as to embrace the hoof upon opposite sides when the invention is being used. The clamp members 1 are pivoted together at corresponding end portions thereof, the said end portions being provided with a plurality of openings 2, through which the pivotal fastening 3, by which the members are secured together, passes. The openings 2 are arranged at intervals and may be provided in any suitable number, so as to permit of adjustment of the clamp members 1 in accordance with the size of the hoof to be operated upon. The members 1 are cut away upon the upper and lower sides adjacent the openings 2, so as to dispose the end portions about in the plane of each other, the spreading movement of the members 1 being limited by the cut-away portions in an obvious manner.

A knife 4 is pivotally supported beneath the clamp members 1, said knife being adapted for a rotary movement in the cutting action thereof. To support the knife 4, which is provided with a handle 5, arms 6 are projected from the under side of the clamp members 1, said arms 6 being rigidly secured to the clamp members by fastenings, such as rivets or the like, at one end. The opposite ends of the supporting-arms 6 are pivotally secured together by means of a pivot-pin 7, which also constitutes the pivot-pin upon which the knife 4 is mounted. It is necessary that the arms 6 be pivotally secured together in order that a pivotal movement of the clamp-arms 1 may be permitted.

Handles 8 are secured to the ends of the clamp-arms 1 opposite the pivoted ends, said handles being pivoted to the clamp members, as shown at 9. The handles 8 are pivoted so as to admit of a certain amount of adjustment toward and from each other and are fixed in an adjusted position by means of bolts 10, which are carried by the handles and which are extended through slots 11, provided upon the end portions of the clamp members. The handles are thus adapted for the lateral adjustment above mentioned simply by manipulating the set screws or nuts 12 to fix the position thereof.

To increase the binding or clamping effect of the arms 1 when engaging the hoof, it is preferred to provide spurs or points 13, which are projected inwardly from the inner sides of the clamp members 1.

The knife 4 is provided with double cutting edges, so that the cutting operation may be effected as the knife is moved in either direction in its rotary path.

Having thus described the invention, what is claimed as new is—

1. In a hoof-trimming device, the combination with hoof-engaging clamp members pivoted at corresponding ends, handles secured to the opposite ends of the clamp members, means for adjusting said handles toward and from each other, a support projected from the clamp members, and a knife pivoted to said support and disposed beneath the clamp members.

2. In a hoof-trimming device, the combination with curved hoof-engaging clamp members adjustably pivoted at corresponding ends, adjustable handles extended from the opposite ends of the clamp members, means for fixing the adjustment of said handles relative to each other, supporting-arms rigidly secured at one end to the clamp members and projected downwardly therefrom, the lower ends of said supporting-arms being pivoted together, and a knife provided with double cutting edges mounted upon the pivot of the supporting-arms aforesaid and adapted for a rotary movement beneath the clamp members.

3. In a hoof-trimming device, the combination with clamp members provided at corresponding ends with a plurality of openings at intervals therein, a pivot adjustable in the said openings of the clamp members, the opposite ends of the clamp members being provided with elongated slots, handles pivoted to the clamp members, adjustable fastenings carried by said handles and coöperating with the slots in the clamp members to fix the adjustment of the handles, supporting-arms projected downwardly from the under side of the clamp members and having their lower ends pivoted together, a rotating knife mounted upon the pivot of the supporting-arms aforesaid, and engaging spurs projected from the inner sides of the clamp members.

In testimony whereof we affix our signatures in presence of two witnesses.

JAMES A. STEINHEIMER. [L. S.]
GEORGE WASHINGTON MILLER. [L. S.]

Witnesses:
ELMER M. COOPER,
J. R. BENIGER.